United States Patent
Miyajima et al.

(10) Patent No.: US 8,326,264 B2
(45) Date of Patent: Dec. 4, 2012

(54) MOBILE COMMUNICATION NETWORK SYSTEM AND LOCKING METHOD OF A MOBILE TERMINAL APPARATUS

(75) Inventors: Naoto Miyajima, Kawasaki (JP); Yuji Yamazaki, Tokyo (JP); Tomoko Ishii, Kawasaki (JP); Tomoya Murao, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1124 days.

(21) Appl. No.: 11/904,730

(22) Filed: Sep. 27, 2007

(65) Prior Publication Data

US 2008/0070590 A1    Mar. 20, 2008

(30) Foreign Application Priority Data

Oct. 2, 2006   (JP) ................................. 2006-271083

(51) Int. Cl.
*H04M 1/66* (2006.01)
*H04M 1/68* (2006.01)
*H04M 3/16* (2006.01)

(52) U.S. Cl. ...................... 455/410; 455/411; 455/412.1; 455/414.1; 455/418; 455/466; 370/310.2; 380/277

(58) Field of Classification Search .................. 455/410, 455/411, 412.1, 414.1, 418–420, 423–425, 455/466; 370/310.2; 380/277–286
See application file for complete search history.

(56) References Cited

U.S. PATENT DOCUMENTS

| | | | | |
|---|---|---|---|---|
| 5,835,858 A | * | 11/1998 | Vaihoja et al. | 455/419 |
| 6,311,055 B1 | * | 10/2001 | Boltz | 455/414.1 |
| 6,415,142 B1 | * | 7/2002 | Martineau | 455/411 |
| 6,463,300 B1 | * | 10/2002 | Oshima | 455/558 |
| 2002/0147028 A1 | * | 10/2002 | Alos et al. | 455/558 |
| 2003/0021413 A1 | * | 1/2003 | Kiiveri et al. | 380/247 |
| 2004/0005912 A1 | * | 1/2004 | Hubbe et al. | 455/558 |
| 2004/0236693 A1 | * | 11/2004 | Quesselaire | 705/50 |
| 2006/0211408 A1 | | 9/2006 | Yamagishi et al. | |
| 2008/0220744 A1 | * | 9/2008 | Rydgren et al. | 455/411 |

FOREIGN PATENT DOCUMENTS

| | | |
|---|---|---|
| CN | 1516503 A | 7/2004 |
| CN | 1781326 A | 5/2006 |
| EP | 1473952 A1 | 3/2004 |
| GB | 2380356 A | 2/2003 |
| JP | 08-251660 | 9/1996 |

(Continued)

OTHER PUBLICATIONS

Chinese Office Action for CN Patent App. No. 200710161699.X, dated Jul. 7, 2010.

(Continued)

*Primary Examiner* — Steve D Agosta
(74) *Attorney, Agent, or Firm* — Michaud-Kinney Group LLP (57) ABSTRACT

In a mobile communication network system for locking an operation on a cellular telephone comprised of a cellular telephone body, and an information storage medium that is inserted in the cellular telephone body and that is assigned a specific telephone number, provided are a service control apparatus that associates a terminal identification number assigned to the cellular telephone with the telephone number of the information storage medium currently inserted in the cellular telephone to manage, and an information management server which acquires a telephone number of the information storage medium corresponding to the terminal identification number of the cellular telephone targeted for locking from the service control apparatus, and locks the operation on the cellular telephone based on the telephone number.

4 Claims, 9 Drawing Sheets

FOREIGN PATENT DOCUMENTS

| | | |
|---|---|---|
| JP | H09018584 A | 1/1997 |
| JP | 2002-259869 | 9/2002 |
| JP | 2003-070064 | 3/2003 |
| JP | 2004-166215 | 6/2004 |
| JP | 2004349902 A | 12/2004 |
| JP | 2006222728 A | 8/2006 |
| JP | 2006261990 A | 9/2006 |
| WO | 2005015932 A1 | 2/2005 |

OTHER PUBLICATIONS

Japanese Office Action for JP Patent Application No. 2006-271083 Dated Jul. 5, 2011.

Extended European Search Report for EP App No. 07117385.0.

* cited by examiner

| CONTRACT No. | TELEPHONE NUMBER | SERIAL NUMBER | STATUS |
|---|---|---|---|
| 10001 | 090-111X-1111 | AAAA | NORMAL STATE |
| 10002 | 090-111X-1112 | BBBB | NORMAL STATE |
| 10003 | 090-111X-1113 | CCCC | NORMAL STATE |
| 10004 | 090-111X-1114 | DDDD | NORMAL STATE |
| 10005 | 090-111X-1115 | EEEE | NORMAL STATE |
| 10006 | 090-111X-1116 | FFFF | NORMAL STATE |

FIG. 4

| SERIAL No. | TELEPHONE NUMBER |
|---|---|
| AAAA | 090-111X-2222 |
| BBBB | 090-111X-1112 |
| CCCC | 090-111X-1113 |
| DDDD | 090-111X-1114 |
| EEEE | 090-111X-1115 |
| FFFF | 090-111X-1116 |

FIG. 5

| TELEPHONE NUMBER | SERIAL NUMBER | POSITION INFORMATION |
|---|---|---|
| 090-111X-2222 | AAAA | AREA1 |
| 090-111X-1112 | BBBB | AREA2 |
| 090-111X-1113 | CCCC | AREA3 |
| 090-111X-1114 | DDDD | AREA5 |
| 090-111X-1115 | EEEE | AREA2 |
| 090-111X-1116 | FFFF | AREA4 |

MOBILE COMMUNICATION NETWORK SYSTEM AND LOCKING METHOD OF A MOBILE TERMINAL APPARATUS

The present disclosure relates to subject matter contained in Japanese Patent Application No. 2006-271083 filed on Oct. 2, 2006, which are expressly incorporated herein by-reference in its entirety.

BACKGROUND OF THE INVENTION

1. Field of the Invention

The present invention relates to a mobile communication network system and a locking method for a mobile terminal apparatus, and more particularly, to a mobile communication network system and a locking for a mobile terminal apparatus for preventing abuse by a third party when the mobile terminal apparatus such as a cellular telephone or the like is lost or stolen.

2. Description of the Prior Art

In recent years, cellular telephones have been becoming widespread that perform communication with an IC card referred to as a SIM (Subscriber Identification Module) card inserted therein. The SIM card stores an ID code such as a telephone number or the like corresponding to an owner (subscriber), while further storing personal data (such as, for example, data of memory dial with which are registered names of communicating parties of telephone numbers, data of a history of incoming calls and the like) of the owner. By using such a SIM card, for example, even when the owned cellular telephone becomes unusable (failure, battery exhaustion and the like), by inserting the SIM card in a cellular telephone of another person, it is possible to perform a telephone conversation using the ID code of the user.

However, in the case where the owner loses such a SIM card and the SIM card unintentionally falls into the hands of another person, there is a possibility that a call is placed maliciously by the person who acquires the SIM card, and that the personal data is read. To prevent such trouble, proposed is a mobile communication terminal where a lock code is stored in the SIM card, and by comparing the lock code with a lock code received from another communication terminal via a wireless communication channel, the operation on the mobile terminal apparatus body and access to the SIM card is locked (for example, Japanese Laid-Open Patent Publication No. 2003-70064).

However, in the aforementioned conventional mobile communication terminal, since the locking operation is performed based on the lock code and the like stored in a SIM card, when the SIM card is intentionally replaced, there is a problem that it is not possible to lock the operation on the mobile terminal apparatus body and access to the SIM card.

Particularly, in recent years, cellular telephones themselves become more sophisticated in functionality, and such a situation is assumed that a third party steals a cellular telephone of another person to insert a SIM card owned by the third party to use. However, in the above-mentioned conventional mobile communication terminal, unless owners of the cellular telephone and the SIM card agree with each other, the locking operation cannot be performed, and there is a problem that it is not possible to prevent such abuse.

SUMMARY OF THE INVENTION

It is an object of the present invention to provide a mobile communication network system and a locking method of a mobile terminal apparatus enabling prevention of abuse of the mobile terminal apparatus by a third party even in the case where an information storage medium is replaced when the mobile terminal apparatus is lost or stolen.

A mobile communication network system of the invention is a mobile communication network system for locking an operation on a mobile terminal apparatus comprised of a mobile terminal apparatus body, and an information storage medium that is inserted in the mobile terminal apparatus body and that is assigned a specific telephone number, and is characterized by having a service control apparatus that associates a terminal identification number assigned to the mobile terminal apparatus body with the telephone number of the information storage medium currently inserted in the mobile terminal apparatus body to manage, and a lock control apparatus which acquires a telephone number of the information storage medium corresponding to the terminal identification number of the mobile terminal apparatus targeted for locking from the service control apparatus, and locks the operation on the mobile terminal apparatus based on the telephone number.

According to this configuration, the terminal identification number of the mobile terminal apparatus body and the telephone number of the currently inserted information storage medium are associated with each other and managed in the service control apparatus, and the operation on the mobile terminal apparatus is locked by the lock control apparatus based on the telephone number of the information storage medium corresponding to the terminal identification number of the mobile terminal apparatus targeted for locking. Therefore, it is possible to specify the mobile terminal apparatus targeted for locking based on the terminal identification number of the mobile terminal apparatus body, and to lock the operation on the mobile terminal apparatus. It is thereby possible to prevent abuse of the mobile terminal apparatus by a third party even in the case where the information storage medium is replaced when the mobile terminal apparatus is lost or stolen.

In the above-mentioned mobile communication network system, the service control apparatus preferably updates the telephone number of the information storage medium whenever the information storage medium is inserted in the mobile terminal apparatus body. In this case, since the telephone number of the information storage medium is updated whenever the information storage medium is inserted in the mobile terminal apparatus body, it is possible to grasp the telephone number of the information storage medium inserted in the mobile terminal apparatus body.

For example, in the above-mentioned mobile communication network system, it can be considered that the lock control apparatus locks the operation on the mobile terminal apparatus using Short Message Service (SMS). Particularly, it is conceivable that the operation on the mobile terminal apparatus is locked by transmitting a short message to instruct to lock the operation on the mobile terminal apparatus. In this case, it is possible to lock the operation on the mobile terminal apparatus using the already-existing Short Message Service.

Further, in the mobile communication network system, the short message is preferably retransmitted after a lapse of predetermined time when the operation on the mobile terminal apparatus cannot be locked. In this case, after the previous short message is transmitted, the short message is retransmitted after a lapse of predetermined time. Therefore, for example, even when the lock-targeted mobile terminal apparatus is powered off, or when the mobile terminal apparatus exists outside the communication area, it is possible to lock the operation on the mobile terminal apparatus when the apparatus is powered on or returns to inside the communication area.

Particularly, in the above-mentioned mobile communication network system, when the short message is retransmitted, it is preferable to determine a change in the telephone number of the information storage medium corresponding to the terminal identification number of the mobile terminal apparatus targeted for locking. In this case, it is possible to ascertain whether the information storage medium is replaced in the mobile terminal apparatus targeted for locking. Then, when the telephone number is changed in the information storage medium corresponding to the terminal identification number of the mobile terminal apparatus targeted for locking, it is preferable that retransmission of the short message is halted. In this case, when the information storage medium is replaced until the short message is retransmitted, it is possible to avoid transmission of a useless short message. Further, when the telephone number is changed in the information storage medium corresponding to the terminal identification number of the mobile terminal apparatus targeted for locking, it is preferable that the lock control apparatus acquires again a telephone number of the information storage medium corresponding to the mobile terminal apparatus from the service control apparatus. In this case, even when the information storage medium is replaced, it is possible to lock the operation on the mobile terminal apparatus based on the new telephone number.

Further, in the above-mentioned mobile communication network system, the terminal identification number of the mobile terminal apparatus is, for example, a serial number of the mobile terminal apparatus. In this case, it is possible to lock the operation on the mobile terminal apparatus using the serial number assigned in its manufacturing.

A locking method of a mobile terminal apparatus of the invention is directed to locking an operation on the mobile terminal apparatus comprised of a mobile terminal apparatus body, and an information storage medium that is inserted in the mobile terminal apparatus body and that is assigned a specific telephone number, and includes a step of associating a terminal identification number assigned to the mobile terminal apparatus body with the telephone number of the information storage medium currently inserted in the mobile terminal apparatus body to manage, a step of acquiring a telephone number of the information storage medium corresponding to the terminal identification number of the mobile terminal apparatus targeted for locking, and a step of locking the operation on the mobile terminal apparatus based on the telephone number.

According to this method, the terminal identification number of the mobile terminal apparatus body and the telephone number of the currently inserted information storage medium are associated with each other and managed, and the operation on the mobile terminal apparatus is locked based on the telephone number of the information storage medium corresponding to the terminal identification number of the mobile terminal apparatus targeted for locking. Therefore, it is possible to specify the mobile terminal apparatus targeted for locking based on the terminal identification number of the mobile terminal apparatus body, and to lock the operation on the mobile terminal apparatus. It is thereby possible to prevent abuse of the mobile terminal apparatus by a third party even in the case where the information storage medium is replaced when the mobile terminal apparatus is lost or stolen.

In the locking method of the mobile terminal apparatus, it is preferable that the telephone number of the information storage medium is updated whenever the information storage medium is inserted in the mobile terminal apparatus body. In this case, since the telephone number of the information storage medium is updated whenever the information storage medium is inserted in the mobile terminal apparatus body, it is possible to grasp the telephone number of the information storage medium inserted in the mobile terminal apparatus body.

For example, in the above-mentioned locking method of the mobile terminal apparatus, it can be considered that the operation on the mobile terminal apparatus is locked using Short Message Service (SMS). Particularly, it is conceivable that the operation on the mobile terminal apparatus is locked by transmitting a short message to instruct to lock the operation on the mobile terminal apparatus. In this case, it is possible to lock the operation on the mobile terminal apparatus using the already-existing Short Message Service.

Further, in the locking method of the mobile terminal apparatus, the short message is preferably retransmitted after a lapse of predetermined time when the operation on the mobile terminal apparatus cannot be locked. In this case, after the previous short message is transmitted, the short message is retransmitted after a lapse of predetermined time. Therefore, for example, even when the lock-targeted mobile terminal apparatus is powered off, or when the mobile terminal apparatus exists outside the communication area, it is possible to lock the operation on the mobile terminal apparatus when the apparatus is powered on or returns to inside the communication area.

Particularly, in the above-mentioned locking method of the mobile terminal apparatus, when the short message is retransmitted, it is preferable to determine a change in the telephone number of the information storage medium corresponding to the terminal identification number of the mobile terminal apparatus targeted for locking. In this case, it is possible to grasp on whether the information storage medium is replaced in the mobile terminal apparatus targeted for locking. Then, when the telephone number is changed in the information storage medium corresponding to the terminal identification number of the mobile terminal apparatus targeted for locking, it is preferable that retransmission of the short message is halted. In this case, when the information storage medium is replaced until the short message is retransmitted, it is possible to avoid transmission of a useless short message. Further, when the telephone number is changed in the information storage medium corresponding to the terminal identification number of the mobile terminal apparatus targeted for locking, it is preferable to acquire again a telephone number of the information storage medium corresponding to the mobile terminal apparatus. In this case, even when the information storage medium is replaced, it is possible to lock the operation on the mobile terminal apparatus based on the new telephone number.

Further, in the above-mentioned locking method of the mobile terminal apparatus, the terminal identification number of the mobile terminal apparatus is, for example, a serial number of the mobile terminal apparatus. In this case, it is possible to lock the operation on the mobile terminal apparatus using the serial number assigned in its manufacturing.

BRIEF DESCRIPTION OF THE DRAWINGS

The various features of novelty which characterize the invention are pointed out with particularity in the claims attached to and forming a part of this specification. For a better understanding of the invention, its operating advantages, and specific objects attained by its use, reference should be had to the accompanying drawing and descriptive matter in which there is illustrated and described a preferred embodiment of the invention.

DESCRIPTION OF THE PREFERRED EMBODIMENTS

An embodiment of the present invention will specifically be described below with reference to accompanying drawings. In addition, in the following descriptions, the case is explained where the mobile communication network system embodies the invention, but the invention is directed to a locking method of a mobile terminal apparatus in the mobile communication network system.

Figure 1:
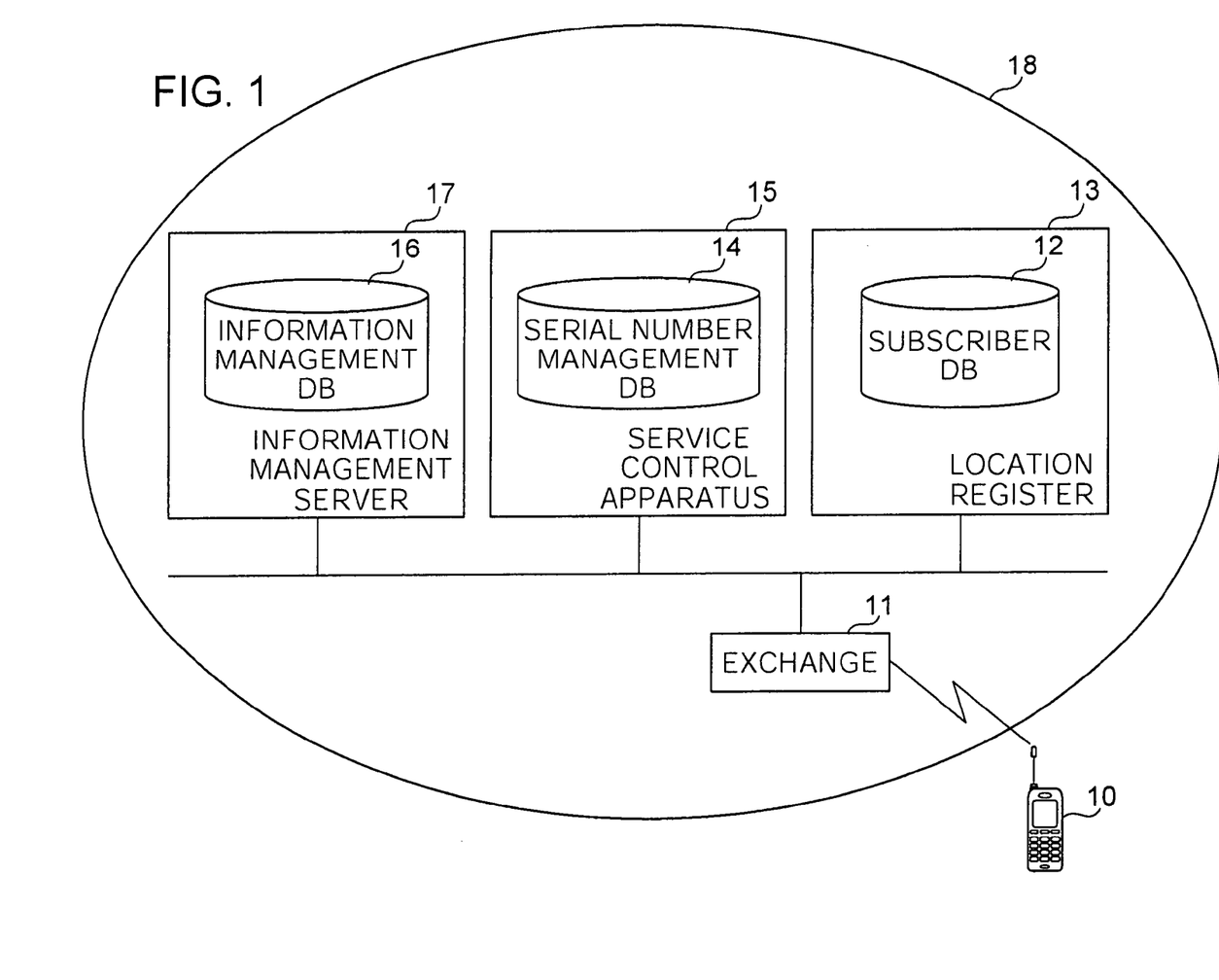
FIG. 1 is a diagram illustrating a configuration of a mobile communication network system according to one embodiment of the invention.

FIG. 1 is a diagram illustrating a configuration of the mobile communication network system according to one embodiment of the invention. In addition, in FIG. 1, a cellular telephone is used and described as an example of a mobile terminal apparatus, but the invention is not limited thereto, and any mobile terminal apparatus capable of transmitting and receiving Short Message Service (SMS) described later is applicable. Further, for convenience in explanation, the case is described herein where a single cellular telephone is connected on the mobile communication network system, but a plurality of cellular telephones can certainly be connected.

In the following explanation, the cellular telephone is assumed to be a cellular telephone allowed to perform communication by inserting a SIM card as an information storage medium. Therefore, for example, when the owned cellular telephone becomes unusable (failure, battery exhaustion and the like), by inserting the own SIM card in a cellular telephone of another person, it is possible to perform a telephone conversation using the telephone number of the user.

As shown in FIG. 1, the mobile communication network system according to this embodiment is comprised of a mobile communication network 18 having therein an exchange 11 that holds a cellular telephone 10, a location register 13 having a subscriber database (DB) 12 in which is stored position information, subscriber data and the like of the cellular telephone 10, a service control apparatus 15 that has a serial number management database (hereinafter, referred to as a "serial number management DB") 14 in which are stored a telephone number (more specifically, a telephone number stored in the SIM card inserted into the cellular telephone 10) of the cellular telephone 10 and a serial number assigned to the terminal itself of the cellular telephone 10 in associated with each other, and an information management server 17 having an information management database (DB) 16 in which is stored initial registration information, status information (for example, locked state or normal state) and the like of all cellular telephones including the cellular telephone 10. In addition, the information management server 17 functions as a lock control apparatus.

As described later, with the subscriber DB 12 and serial number management DB 14 are registered necessary information from the information management DB 16, and information corresponding to a control signal transmitted from the cellular telephone. In such a mobile communication network system, when a normal call is placed, based on a telephone number designated from a cellular telephone (not shown in the figure) of a source, the location register 13 grasps the position information (area information) of a cellular telephone of a destination, and a wireless communication path is formed between the source and destination via an exchange corresponding to the position information.

In addition to such normal calling functions, the mobile communication network system according to this embodiment provides a function of locking the operation on a cellular telephone designated from a user. Particularly, when the SIM card is replaced by a malicious third party, the operation on the cellular telephone with the replaced card is locked. More specifically, a telephone number of the cellular telephone is specified from a serial number as a terminal identification number of the cellular telephone targeted for locking, and using the telephone number, the operation on the cellular telephone is locked. Described below are a configuration of the service control apparatus 15 of the distinctive configuration, information referred to in locking the operation on the cellular telephone 10, and the like.

Figure 2:
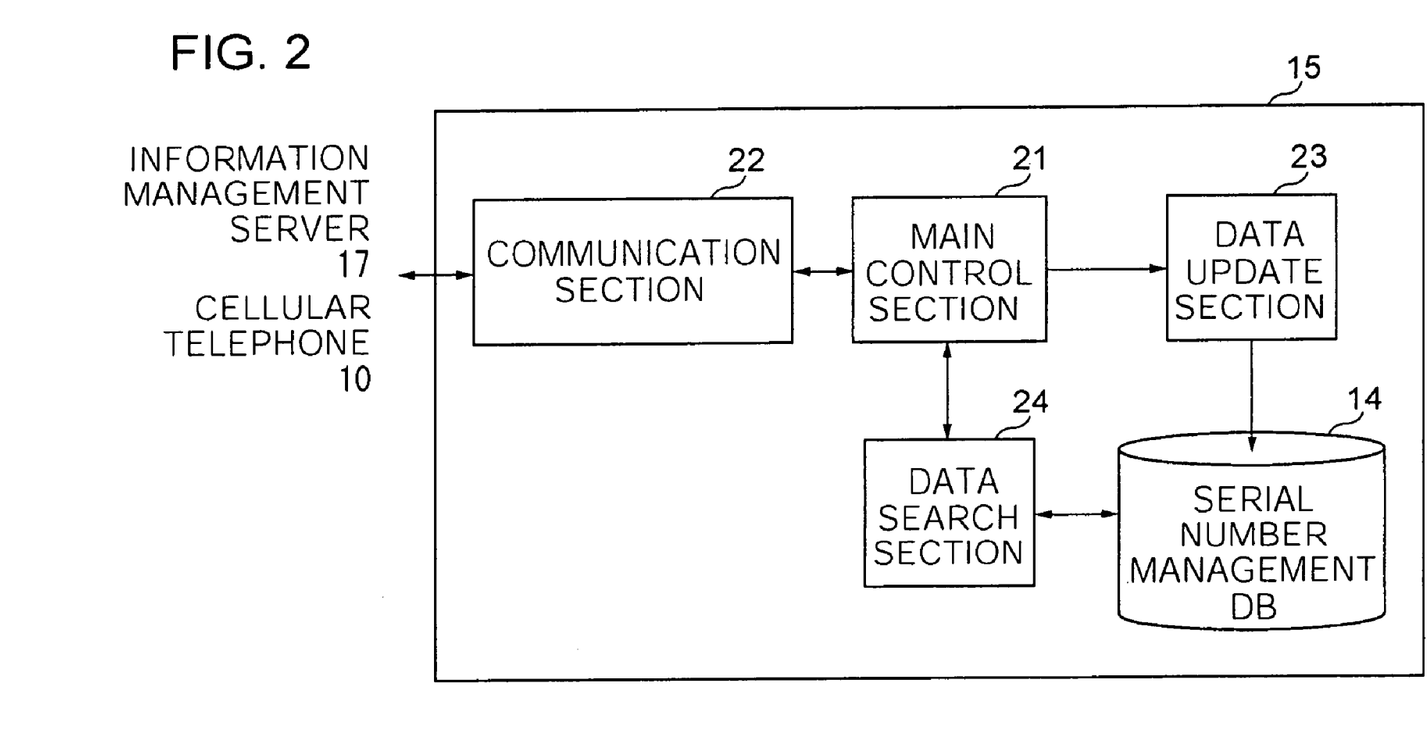
FIG. 2 is a functional block diagram illustrating a configuration of a service control apparatus in the mobile communication network system according to the above-mentioned embodiment.

FIG. 2 is a functional block diagram illustrating the configuration of the service control apparatus 15 in the mobile communication network system according to this embodiment. As shown in FIG. 2, the service control apparatus 15 is comprised of a main control section 21 that controls the entire apparatus, a communication section 22 that communicates with the information management server 17 and cellular telephone 10, a data update section 23 that registers data with the serial number management DB 14 and that updates the data stored in the serial number management DB 14, and a data search section 24 that performs a search for data stored in the serial number DB 14.

While having such a configuration, as described later on details, the service control apparatus 15 searches for a telephone number (telephone number stored in the SIM card) of a cellular telephone in response to an inquiry of the user of the cellular telephone (including the serial number of the cellular telephone) from the information management server 16, and sends the telephone number to the information management server 16 as a response. Corresponding to the telephone number (telephone number stored in the SIM card) of the cellular telephone sent as a response from the service control apparatus 15, the information management server 16 executes the processing for locking the operation on the cellular telephone 10.

Figure 3:
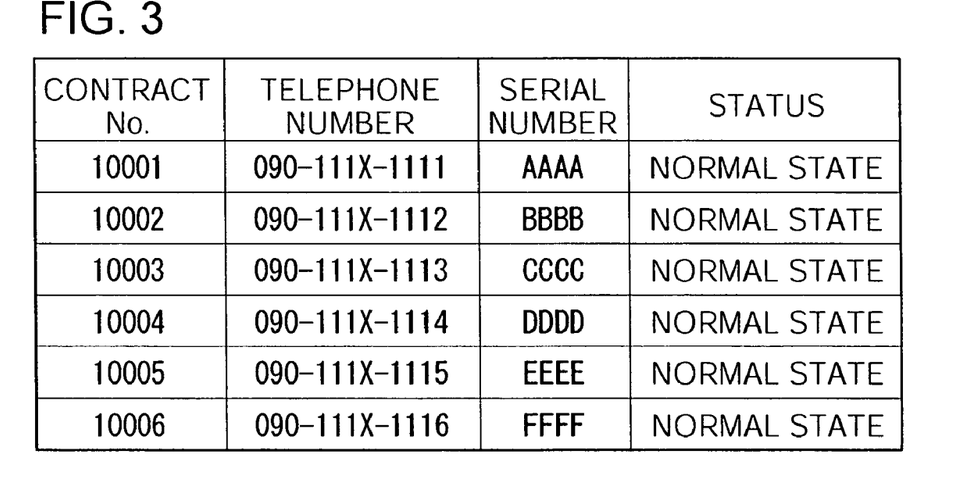
FIG. 3 is a diagram to explain an example of information stored in an information management DB in the mobile communication network system according to the above-mentioned embodiment.

FIG. 3 is a diagram to explain an example of information stored in the information management DB 16 in the mobile communication network system according to this embodiment. As shown in FIG. 3, the information management DB 16 stores a "contract number" assigned for each contract with the subscriber, "telephone number" assigned, to the cellular telephone (SIM card installed in the telephone number) at the time of the contract, specific "serial number" assigned to the terminal itself of the cellular telephone, and "status" indicating whether the status of a current cellular telephone is a locked state or not in association with one another. Among the information, the "contract number", "telephone number" and "serial number" are stored in the information management DB 16 by an application from the user or agreement with a communication provider, and when once registered, are not changed except cancellation, a change of contract and the like. Meanwhile, the "status" is rewritten as appropriate and stored when the telephone is locked or the lock is released in response to a request from the user of the cellular telephone.

For example, in a cellular telephone with contract number "10001", telephone number "090-111X-11111" is assigned, while "AAAA" is assigned as the "serial number", and "normal state" indicating that the telephone is not locked" is registered as the "status". Further, in a cellular telephone with contract number "10002", telephone number "090-111X-1112" is assigned, while "BBBB" is assigned as the "serial number", and "normal state" indicating that the telephone is not locked" is registered as the "status". In addition, when the operation on the cellular telephone is locked, "locked state" indicating that the telephone is locked is registered with the "status".

Figure 4:
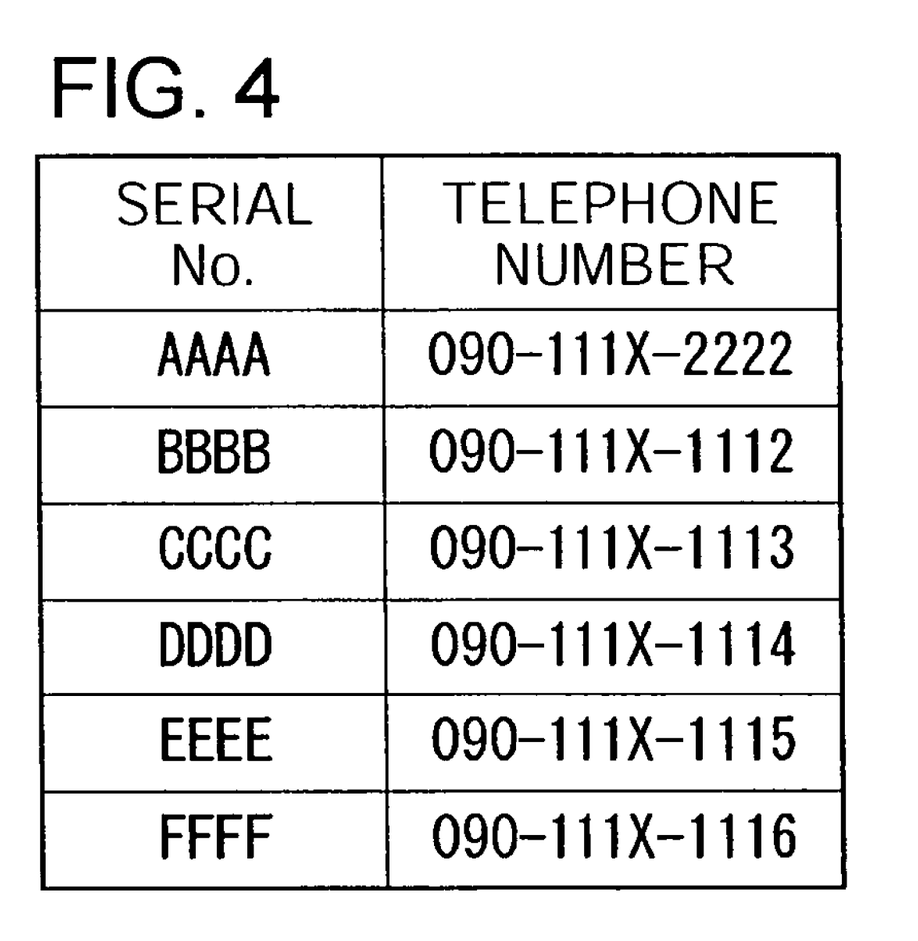
FIG. 4 is a diagram to explain an example of information stored in a serial number management DB in the mobile communication network system according to the above-mentioned embodiment.

FIG. 4 is a diagram to explain an example of information stored in the serial number management DB 14 in the mobile communication network system according to this embodiment. As shown in FIG. 4, the serial number management DB 14 stores the "serial number" and "telephone number" assigned to the cellular telephone in association with each other. The "serial number" and "telephone number" in the serial number management DB 14 are received from the information management DB 16 at predetermined timing and registered when the corresponding "serial number" and "telephone number" are registered with the information management DB 16. Among them, the "serial number" is not updated when registered once, and in contrast thereto, the "telephone number" is rewritten as appropriate and stored corresponding to a control signal transmitted from the cellular telephone. Particularly, in the mobile communication network system according to this embodiment, it is configured that the "telephone number" is rewritten whenever the SIM card is replaced.

For example, the cellular telephone with serial number "AAAA" is associated with telephone number "090-111X-2222". Further, the cellular telephone with serial number "BBBB" is associated with telephone number "090-111X-1112". In FIG. 4, the case is shown where in the cellular telephone with serial number "AAAA", the SIM card inserted in the telephone is replaced. In other words, the case is shown where the SIM card with telephone number "090-111X-1111" stored therein was inserted at the time of contract, and in contrast thereto, the SIM card with telephone number "090-111X-2222" stored therein is inserted at the present time.

Figure 5:
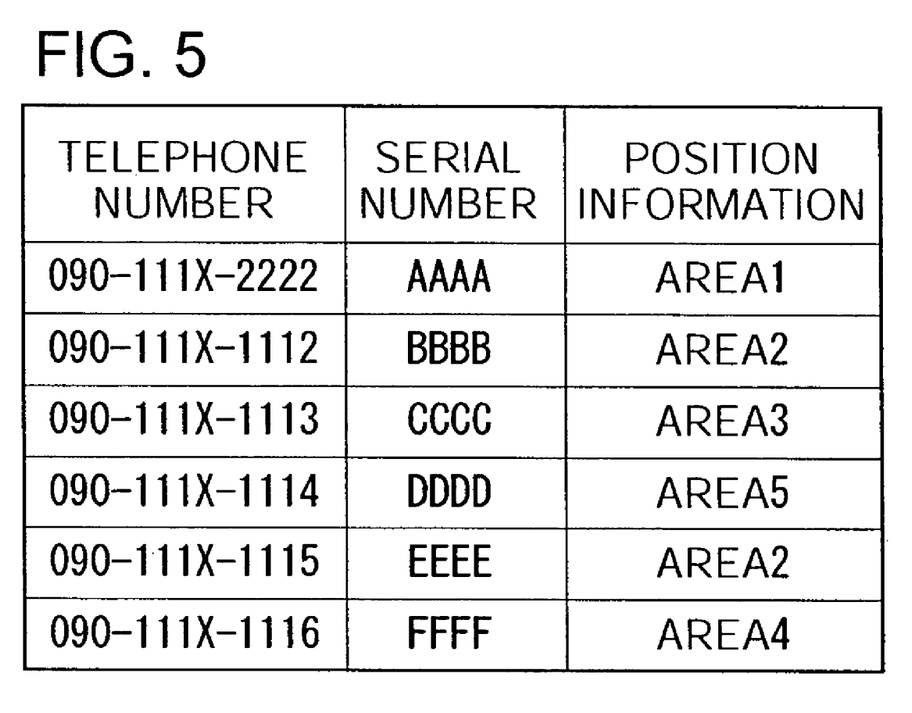
FIG. 5 is a diagram to explain an example of information stored in a subscriber DB in the mobile communication network system according to the above-mentioned embodiment.

FIG. 5 is a diagram to explain an example of information stored in the subscriber DB 12 in the mobile communication network system according to this embodiment. As shown in FIG. 5, the subscriber DB 12 stores the "telephone number" and "serial number" assigned to the cellular telephone and current "position information" of the cellular telephone in association with each other. Among these pieces of information, the "telephone number" and "serial number" are received from the information management DB 16 at predetermined timing and registered when the corresponding "telephone number" and "serial number" are registered with the information management DB 16. Among them, the "serial number" is not updated when registered once, and in contrast thereto, the "telephone number" is rewritten as appropriate and stored corresponding to a control signal transmitted from the cellular telephone. Particularly, in the mobile communication network system according to this embodiment, it is configured that the "telephone number" is rewritten whenever the SIM card is replaced. Further, the "position information" is rewritten as appropriate and stored corresponding to a control signal transmitted from the cellular telephone.

For example, the cellular telephone with telephone number "090-111X-2222" has "AAAA" registered as the "serial number", and currently exists in "area 1". Meanwhile, the cellular telephone with telephone number "090-111X-1112" has "BBBB" registered as the "serial number", and currently exists in "area 2". Also in FIG. 5, as in the serial number management DB 14 as shown in FIG. 4, the case is shown where in the cellular telephone with serial number "AAAA", the SIM card inserted in the telephone is replaced.

Described below is processing when the operation on a cellular telephone is locked in the mobile communication network system according to this embodiment. Herein, described are (1) a case where the locking operation on the cellular telephone is normally performed, (2) a case where the locking operation on the cellular telephone is repeated, (3) a case where disagreement is detected between combinations of the serial number and telephone number of the cellular telephone before the locking operation on the cellular telephone is repeated, and (4) a case where disagreement is detected between combinations of the serial number and telephone number of the cellular telephone during repetitions of the locking operation on the cellular telephone.

In addition, in the following descriptions, it is assumed that the information management DB 16, serial number management DB 14 and subscriber DB 12 store the information as shown in FIGS. 3, 4 and 5, respectively. Further, the terminal itself of the cellular telephone 10 targeted for locking is assumed to be assigned serial number "AAAA" as shown in FIGS. 3 to 5. In other words, it is assumed that the SIM card is replaced by a malicious third party, and that telephone number "090-111X-1111" of the cellular telephone 10 registered with the information management server 17 at the initial registration is changed to different telephone number "090-111X-2222".

Figure 6:
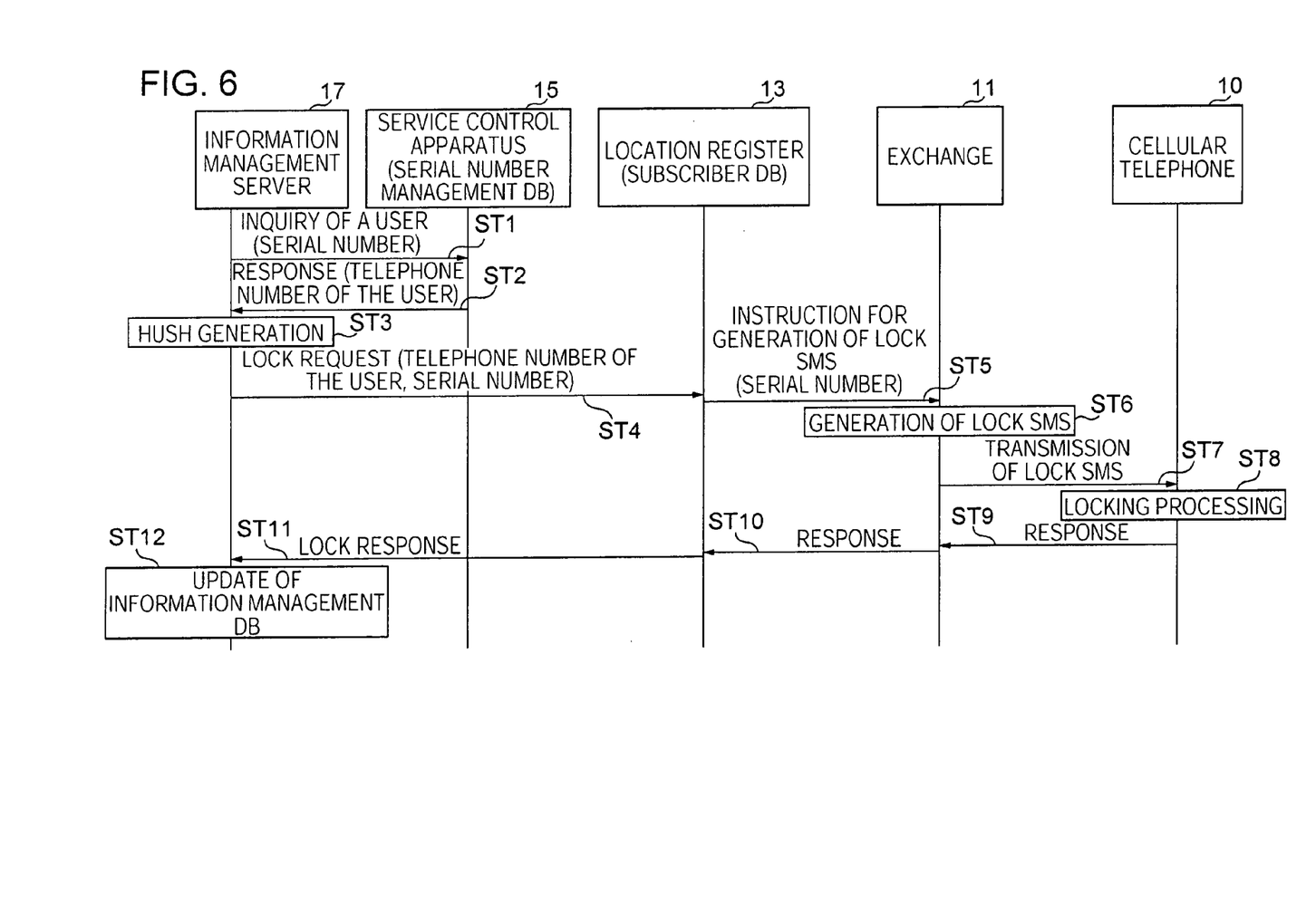
FIG. 6 is a sequence diagram to explain processing when the locking operation on a cellular telephone is normally performed in the mobile communication network system according to the above-mentioned embodiment.

(1) The case where the locking operation on the cellular telephone is normally performed FIG. 6 is a sequence diagram to explain the processing when the locking operation on the cellular telephone is normally performed in the mobile communication network system according to this embodiment. The locking operation on the cellular telephone 10 is started corresponding to instructions from an operator by a request of the user wishing locking to a store where the user purchased the cellular telephone 10, and the like. The operator receiving the request for locking on the cellular telephone 10 specifies the serial number of the cellular telephone 10 targeted for locking, while instructing the information management server 17 to lock the cellular telephone 10.

Upon receiving the instructions to lock the cellular telephone 10 from the operator, the information management server 17 first transmits an inquiry about the user to the service control apparatus 15 (serial number management DB 14) (step (hereinafter, abbreviated as "ST") 1). This inquiry includes serial number "AAAA" assigned to the cellular telephone 10. Upon receiving this inquiry, the service control apparatus 15 searches for a telephone number associated with serial number "AAAA" included in the inquiry, and transmits the telephone number "090-111X-2222" to the information management server 17 (ST2). In other words, instead of telephone number "090-111X-1111" registered at the time of contract, transmitted is telephone number "090-111X-2222" of the current SIM card inserted in the cellular telephone 10.

Upon receiving the telephone number from the service control apparatus 15, the information management server 17 generates a hash function for the user to prevent the information from leaking due to the locking operation (ST3). Then, after the hash function is generated, the information management server 17 transmits a lock request to lock the cellular telephone 10 to the location register 13 (ST4). The lock request includes the telephone number (telephone number stored in the SIM card) of the user of the cellular telephone 10, and the serial number of the terminal itself of the cellular telephone 10.

Upon receiving the lock request from the information management server 17, the location register 13 searches for an exchange 11 that holds the cellular telephone 10 based on the position information of the cellular telephone 10 registered with the subscriber DB 12. Then, the location register 13 transmits a generation instruction (hereinafter, referred to as a "lock SMS generation instruction") of Short Message Service (hereinafter, referred to as "lock SMS") to lock the operation on the cellular telephone 10 (ST5). The lock SMS generation instruction includes the serial number of the terminal itself of the cellular telephone 10.

Upon receiving the lock SMS generation instruction from the location register 13, the exchange 11 generates lock SMS (ST6), and transmits the generated lock SMS to the cellular telephone 10 (ST7). Upon receiving the lock SMS, the cellular telephone 10 determines the serial number included in the lock SMS, and when it is confirmed that the determined serial number agrees with the serial number of the telephone 10, the locking processing is performed (ST8). By this means, the cellular telephone 10 cannot receive any operations.

When the locking processing on the cellular telephone 10 is properly performed, the cellular telephone 10 transmits a response signal indicating the success to the location register 13 via the exchange 11 (ST9, ST10). Upon receiving the response signal, the location register 13 transmits a lock response indicating that the locking processing has properly been performed to the information management server 17 (ST11). Upon receiving the locked response, the information management server 17 updates the information in the information management DB 16 (ST12). Herein, the status corresponding to contact number "10001" shown in FIG. 3 is changed from the "normal state" to "locked state". In this way, the processing is finished in the case where the locking operation on the cellular telephone 10 is properly performed.

(2) The case where the locking operation on the cellular telephone is repeated

Figure 7:
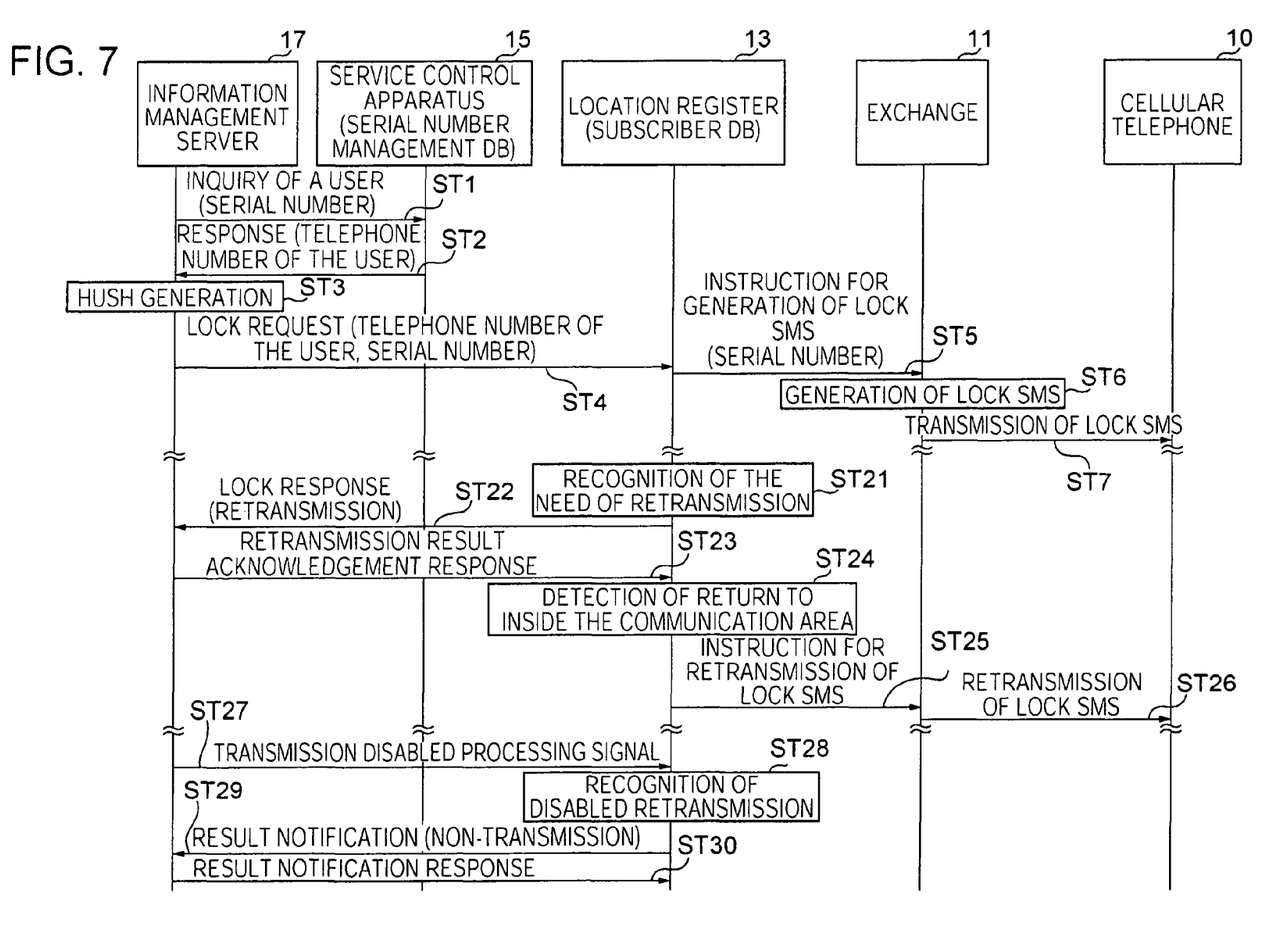
FIG. 7 is a sequence diagram to explain processing when the locking operation on a cellular telephone is repeated in the mobile communication network system according to the above-mentioned embodiment.

FIG. 7 is a sequence diagram to explain processing when the locking operation on the cellular telephone is repeated in the mobile communication network system according to this embodiment. In addition, in FIG. 7, the same processing as the processing shown in FIG. 6 is assigned the same reference numerals to omit descriptions thereof.

For example, when the cellular telephone 10 exists outside the communications area, or the power supply of the cellular telephone 10 is disconnected, as shown in FIG. 7, the lock SMS transmitted from the exchange 11 is not received in the cellular telephone 10. Herein, the cellular telephone 10 is assumed to exist outside the communication area. The location register 13 monitors a response signal from the cellular telephone 10 after transmitting the lock SMS generation instruction to the exchange 11 in ST5, when the response signal is not received after a lapse of predetermined time, recognizes that retransmission of the lock SMS is required (ST21).

Thus, when the location register 13 recognizes the need of retransmission of the lock SMS, the location register 13 transmits a lock response indicating that the lock SMS is to be retransmitted to the information management server 17 (ST22). Upon receiving the lock response, the information management server 17 transmits a retransmission result acknowledgement response indicating that the lock response indicating the retransmission has been received (ST23).

In the case of receiving the retransmission result acknowledgment response, it is herein assumed that the cellular telephone 10 returns to inside the communication area. When the location register 13 detects that the cellular telephone 10 returns to inside the communication area (ST24), with the return as a trigger, the location register 13 transmits an instruction (hereinafter, referred to as a "lock SMS retransmission instruction") to retransmit the lock SMS to the exchange 11 (ST25). Upon receiving the lock SMS retransmission instruction from the location register 13, the exchange 11 retransmits the lock SMS generated in ST6 to the cellular telephone 10 (ST26).

Herein, it is assumed that while retransmission of the lock SMS is repeated, the lock SMS does not arrive at the cellular telephone 10 due to some factor. For a period during which retransmission of the lock SMS is thus repeated, when the information management server 17 transmits a lock-SMS transmission disabled processing signal based on a halt, cancellation or the like of the cellular telephone 10 (ST27), the location register 13 recognizes that the retransmission is disabled (ST28). When disabled retransmission of the lock SMS is recognized, the location register 13 transmits result notification to the information management server 17 (ST29). Herein, it is notified that the lock SMS has not been transmitted.

Upon receiving this result notification, the information management server 17 transmits a result notification response indicating that the result notification has been received to the location register 13 (ST30). In this way, the processing is finished in the case where the locking operation on the cellular telephone 10 is repeated.

Figure 8:
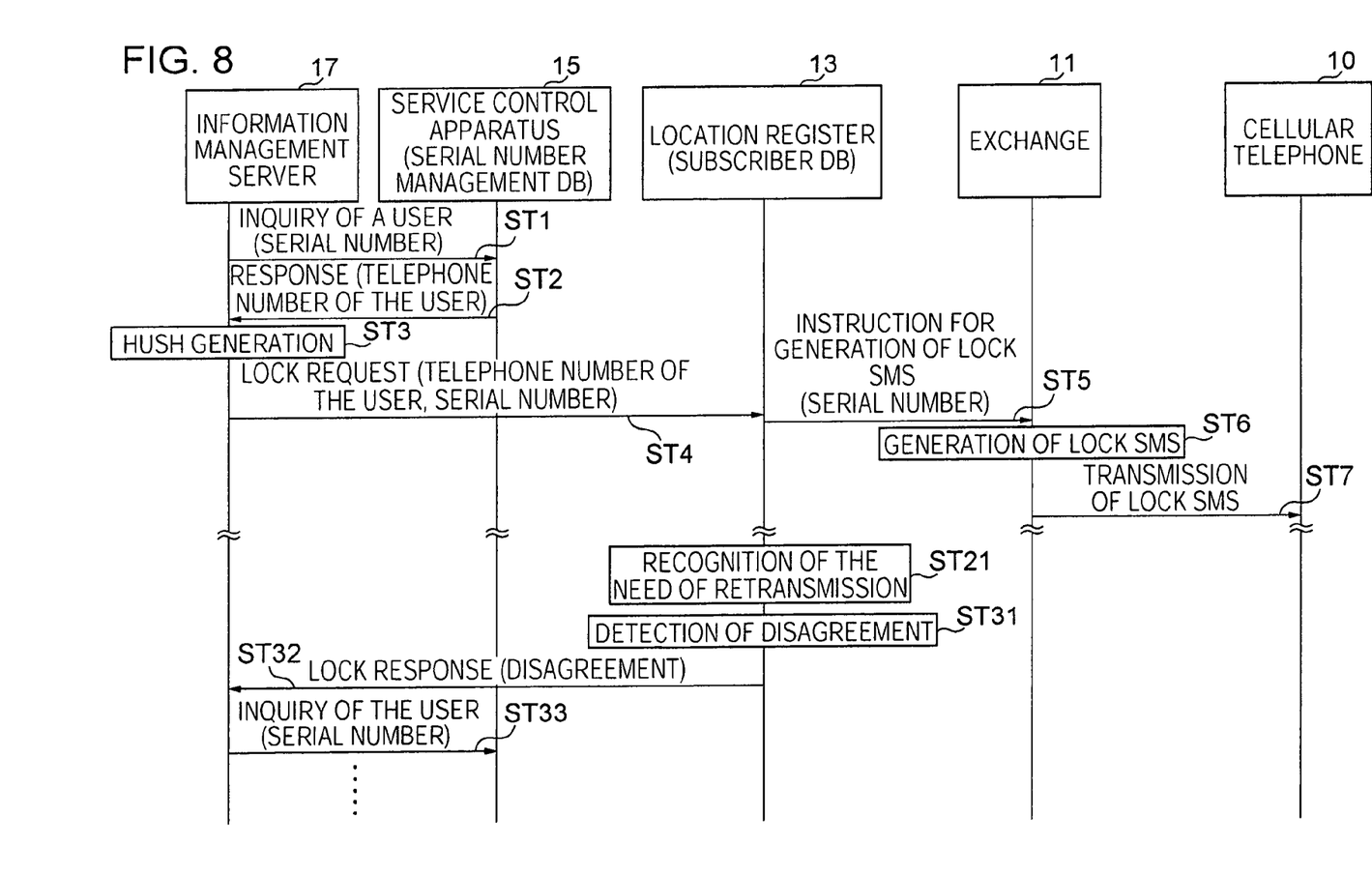
FIG. 8 is a sequence diagram to explain processing when a mismatching is detected between a serial number and telephone number of a cellular telephone before the locking operation on the cellular telephone is repeated in the mobile communication network system according to the above-mentioned embodiment.

(3) The case where disagreement is detected between combinations of the serial number and telephone number of the cellular telephone before the locking operation on the cellular telephone is repeated FIG. 8 is a sequence diagram to explain processing when disagreement is detected between combinations of the serial number and telephone number of the cellular telephone before the locking operation on the cellular telephone is repeated in the mobile communication network system according to this embodiment. In addition, in FIG. 8, the same processing as the processing shown in FIGS. 6 and 7 is assigned the same reference numerals to omit descriptions thereof.

In retransmitting the lock SMS, the location register 13 judges agreement between a combination of the telephone number and serial number included in the previous lock request from the information management server 17 and a combination of the telephone number and serial number registered with the subscriber DB 12. In addition, the judgment of agreement between these combinations is made on the assumption that the SIM card is replaced before retransmission of the lock SMS after the information is acquired from the service control apparatus 15 at ST1 and ST2.

Figure 9:
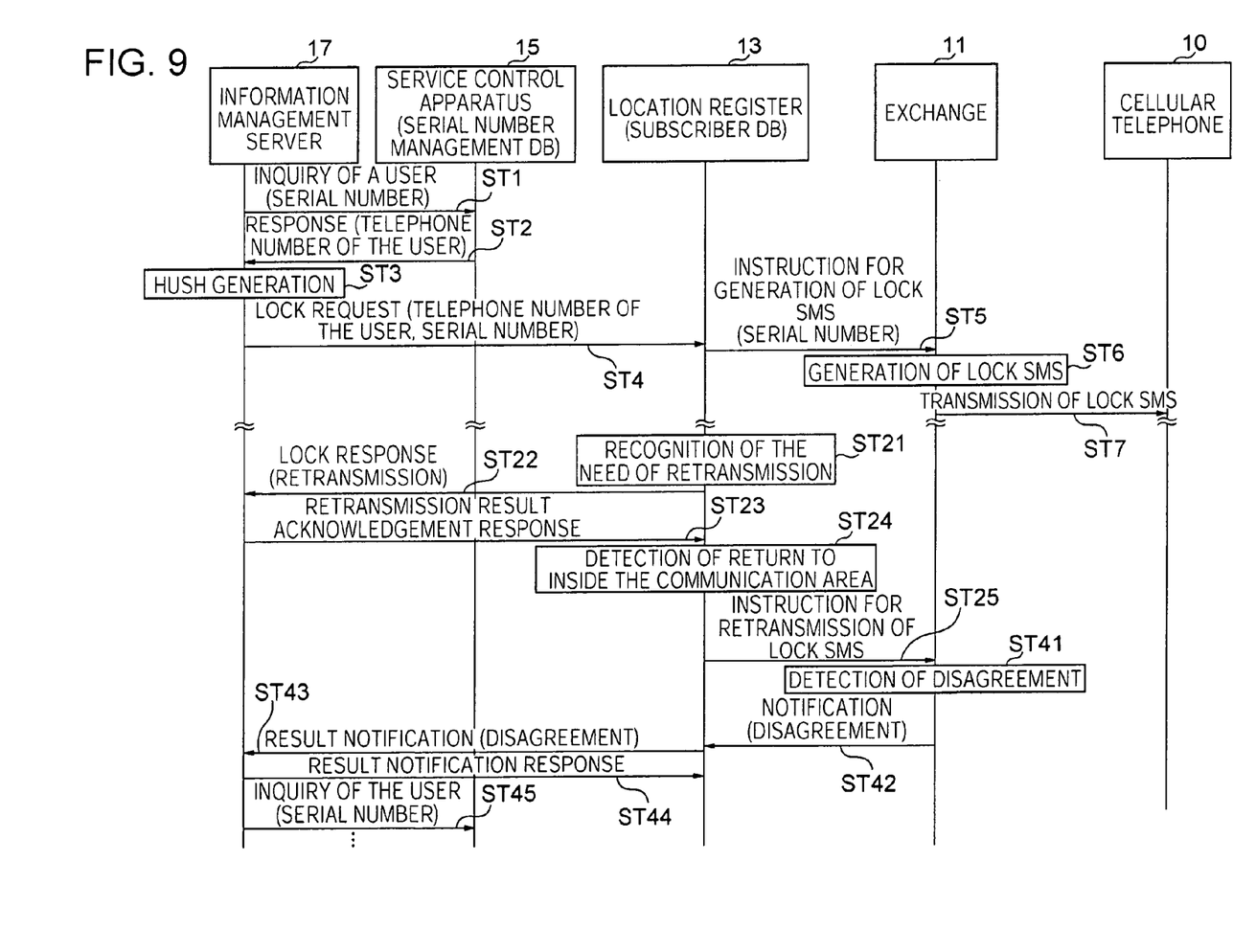
FIG. 9 is a sequence diagram to explain processing when a mismatching is detected between a serial number and telephone number of a cellular telephone during repetitions of the locking operation on the cellular telephone in the mobile communication network system according to the above-mentioned embodiment.

In this case, as shown in FIG. 8, when disagreement is detected between the combinations (ST31), the location register 13 transmits to the information management server 17 a lock response indicating disagreement between the combination of the telephone number and serial number included in the lock request and the combination of the telephone number and serial number registered with the current subscriber DB 12 (ST32). Further, retransmission of the lock SMS is halted. Upon receiving this lock response, the information management server 17 recognizes a mismatching between the telephone number and serial number of the cellular telephone 10, and performs again the processing from the inquiry of the user based on the serial number of the cellular telephone 10 (ST33). Thus, the processing is finished in the case where a mismatching is detected between the serial number and telephone number of the cellular telephone 10 before the locking operation on the cellular telephone 10 is repeated (4) The case where disagreement is detected between combinations of the serial number and telephone number of the cellular telephone during repetitions of the locking operation on the cellular telephone FIG. 9 is a sequence diagram to explain processing when disagreement is detected between combinations of the serial number and telephone number of the cellular telephone during repetitions of the locking operation on the cellular telephone in the mobile communication network system according to this embodiment. In addition, in FIG. 9, the same processing as the processing shown in FIGS. 6 and 7 is assigned the same reference numerals to omit descriptions thereof.

Herein, it is assumed that the exchange 11 receives a combination of a new telephone number and the serial number from the cellular telephone 10 immediately before retransmitting the lock SMS in response to the lock SMS retransmission instruction received at ST25. In other word, this is the case where a new SIM card is inserted in the cellular telephone 10. In this case, the exchange 11 detects disagreement between a combination of the telephone number and serial number included in the previous lock request from the information management server 17 and a combination of the telephone number and serial number newly received from the cellular telephone 10 (ST41).

Thus, when disagreement is detected between the combination of the telephone number and serial number included in the lock request and the combination of the telephone number and serial number newly received from the cellular telephone 10, the exchange 11 notifies the location register 13 of the disagreement between combinations of the telephone number and serial number (ST42). Upon receiving this notification, the location register 13 transmits result notification to the information management server 17 (ST43). Further, retransmission of the lock SMS is halted. Herein, the location register 13 notifies the information management server 17 of disagreement between the combination of the telephone number and serial number included in the lock request and the newly received combination of the telephone number and serial number. Upon receiving this result notification, the information management server 17 transmits a result notification response indicating reception of the result notification to the location register 13 (ST44). Subsequently, the information management server 17 recognizes a mismatching between the telephone number and serial number of the cellular telephone, and performs again the processing from the inquiry of the user based on the serial number of the cellular telephone 10 (ST45). Thus, the processing is finished in the case where a mismatching is detected between the serial number and telephone number of the cellular telephone 10 during repetitions of the locking operation on the cellular telephone 10.

Thus, according to the mobile communication network system according to this embodiment, the service control apparatus 15 manages the serial number (terminal identification number) assigned to the terminal itself of the cellular telephone and the telephone number assigned to the SIM card (information storage medium) currently inserted in the cellular telephone in association with each other, and the information management server 17 locks the operation on the cellular telephone 10 based on the telephone number of the SIM card corresponding to the serial number of the cellular telephone 10 targeted for locking. Therefore, it is possible to specify the cellular telephone 10 targeted for locking based on the serial number of the cellular telephone 10, and to lock the operation on the cellular telephone 10. It is thereby possible to prevent abuse of the cellular telephone 10 by a third party even in the case where the SIM card is replaced when the cellular telephone 10 is lost or stolen Particularly, in the mobile communication network system according to this embodiment, the service control apparatus 15 updates the telephone number assigned to the SIM card whenever the SIM card is inserted in the cellular telephone 10 (whenever the card is replaced), and it is thereby possible to grasp the telephone number stored in the information storage medium currently inserted in the cellular telephone 10.

Further, in the mobile communication network system according to this embodiment, the information management server 17 locks the operation on the cellular telephone 10 using Short Message Service (SMS). In particular, the operation on the cellular telephone is locked by transmitting a short message (lock SMS) to instruct to lock the operation on the cellular telephone 10, and it is thus possible to lock the operation on the cellular telephone using the already-existing Short Message Service.

Particularly, in the mobile communication network system according to this embodiment, the short message (lock SMS) is retransmitted after a lapse of predetermined time when the operation on the cellular telephone cannot be locked, and thus, after the previous short message is transmitted, the short message is retransmitted after a lapse of predetermined time. Therefore, for example, even when the lock-targeted cellular telephone is powered off, or when the cellular telephone exists outside the communication area, it is possible to lock the operation on the cellular telephone when the telephone is powered on or returns to inside the communication area.

Further, in the mobile communication network system according to this embodiment, when the short message is retransmitted, a change is determined in the telephone number of the SIM card corresponding to the serial number of the cellular telephone targeted for locking, and it is thereby possible to grasp on whether the SIM card is replaced in the cellular telephone 10 targeted for locking. Then, when the telephone number is changed in the SIM card corresponding to the serial number of the cellular telephone 10 targeted for locking, retransmission of the short message is halted. By this means, when the SIM card is replaced until the short message is retransmitted, it is possible to avoid transmission of a useless short message. Further, when the telephone number is changed in the SIM card corresponding to the serial number of the cellular telephone 10, the information management server 17 acquires again a telephone number of the SIM card corresponding to the cellular telephone 10 from the service control apparatus 15. By this means, even when the SIM card is replaced, it is possible to lock the operation on the cellular telephone 10 based on the new telephone number.

In addition, the present invention is not limited to the above-mentioned embodiment, and is capable of being carried into practice with various modifications thereof within the scope of exerting the effect of the invention. Further, the present invention is capable of being carried into practice with modifications thereof as appropriate without departing from the scope of the present invention.

For example, in the mobile communication network system according to the above-mentioned embodiment, the case is described where the service control apparatus 15 having the serial number management DB 14 is disposed on the network as a separate configuration from the location register 13. However, the configuration on the network is not limited thereto when the functions of the above-mentioned service control apparatus 15 can be served, and is capable of being modified as appropriate. For example, the location register 13 may be installed with the functions of the service control apparatus 15.

Further, in the mobile communication network system according to the above-mentioned embodiment, the case is described where the serial number assigned in manufacturing the cellular telephone is used as a terminal identification number of the cellular telephone, but the invention is not limited thereto. The terminal identification number is capable of being modified on the condition that the number enables identification of the terminal itself of the cellular telephone.

What is claimed is:

1. A mobile communication network system for locking an operation on a mobile terminal apparatus comprised of a mobile terminal apparatus body, and an information storage medium that is inserted in the mobile terminal apparatus body and that is assigned a specific telephone number, comprising:
    a service control apparatus that has a database which associates a terminal identification number assigned to the mobile terminal apparatus body with the telephone number of the information storage medium currently inserted in the mobile terminal apparatus body to manage, the telephone number of the information storage medium are updated whenever the information storage medium is inserted in the mobile terminal apparatus body; and
    a lock control apparatus which specifies a telephone number of the information storage medium currently inserted in the mobile terminal apparatus body targeted for locking based on the database by designating the terminal identification number of the mobile terminal apparatus body targeted for locking, and transmits a short message as a lock instruction signal using Short Message Service (SMS) which locks the operation on the mobile terminal apparatus to the mobile terminal apparatus in which the information storage medium assigned the telephone number is inserted,
    wherein when the operation on the mobile terminal apparatus cannot be locked, the short message is retransmitted after a lapse of predetermined time, and when the short message is retransmitted, a change is determined in the telephone number of the information storage medium corresponding to the terminal identification number of the mobile terminal apparatus targeted for locking, and
    wherein when the telephone number is changed in the information storage medium corresponding to the terminal identification number of the mobile terminal apparatus targeted for locking, retransmission of the short message is halted.

2. The communication network system according to claim 1, wherein when the telephone number is changed in the information storage medium corresponding to the terminal identification number of the mobile terminal apparatus targeted for locking, the lock control apparatus acquires again a telephone number of the information storage medium corresponding to the mobile terminal apparatus from the service control apparatus.

3. A locking method of a mobile terminal apparatus for locking an operation on the mobile terminal apparatus comprised of a mobile terminal apparatus body, and an information storage medium that is inserted in the mobile terminal apparatus body and that is assigned a specific telephone number, comprising:
    generating a database which associates a terminal identification number assigned to the mobile terminal apparatus body with the telephone number of the information storage medium currently inserted in the mobile terminal apparatus body to manage;
    updating the telephone number of the information storage medium in the database whenever the information storage medium is inserted in the mobile terminal apparatus body;
    specifying a telephone number of the information storage medium currently inserted in the mobile terminal apparatus body targeted for locking based on the database designating the terminal identification number of the mobile terminal apparatus body targeted for locking; and
    transmitting a short message as a lock instruction signal using Short Message Service (SMS) which locks the operation on the mobile terminal apparatus to the mobile terminal apparatus in which the information storage medium assigned the telephone number is inserted,
    wherein when the operation on the mobile terminal apparatus cannot be locked, the short message is retransmitted after a lapse of predetermined time and when the short message is retransmitted, a change is determined in the telephone number of the information storage medium corresponding to the terminal identification number of the mobile terminal apparatus targeted for locking wherein when the telephone number is changed in the information storage medium corresponding to the terminal identification number of the mobile terminal apparatus targeted for locking, retransmission of the short message is halted.

4. The locking method of the mobile terminal apparatus according to claim 3, wherein when the telephone number is changed in the information storage medium corresponding to the terminal identification number of the mobile terminal apparatus targeted for locking, a telephone number of the information storage medium is acquired again corresponding to the mobile terminal apparatus.

* * * * *